US010914930B2

(12) United States Patent
Peng et al.

(10) Patent No.: US 10,914,930 B2
(45) Date of Patent: Feb. 9, 2021

(54) STIMULATED EMISSION DEPLETION NONLINEAR STRUCTURED ILLUMINATION MICROSCOPY (STED-NSIM) APPARATUS, METHODS, AND APPLICATIONS

(71) Applicant: Arizona Board of Regents on Behalf of the University of Arizona, Tucson, AZ (US)

(72) Inventors: Leilei Peng, Tucson, AZ (US); Yu Li, Tucson, AZ (US); Han Zhang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/327,984

(22) PCT Filed: Aug. 30, 2017

(86) PCT No.: PCT/US2017/049349
§ 371 (c)(1),
(2) Date: Feb. 25, 2019

(87) PCT Pub. No.: WO2018/045014
PCT Pub. Date: Mar. 8, 2018

(65) Prior Publication Data
US 2019/0235219 A1    Aug. 1, 2019

Related U.S. Application Data

(60) Provisional application No. 62/381,871, filed on Aug. 31, 2016.

(51) Int. Cl.
*G02B 21/00* (2006.01)
*G01N 21/64* (2006.01)
(Continued)

(52) U.S. Cl.
CPC ..... *G02B 21/0076* (2013.01); *G01N 21/6458* (2013.01); *G02B 21/008* (2013.01);
(Continued)

(58) Field of Classification Search
CPC ............ G02B 21/0076; G02B 21/0032; G01N 21/6458
See application file for complete search history.

(56) References Cited

U.S. PATENT DOCUMENTS

2007/0091291 A1    4/2007    Phillips
2009/0073563 A1    3/2009    Betzig
(Continued)

FOREIGN PATENT DOCUMENTS

WO    2014147590    9/2014
WO    2016054118    4/2016

OTHER PUBLICATIONS

Andresen, M., et al., Structural basis for reversible photoswitching in Dronpa. Proceedings of the National Academy of Sciences of the United States of America, 2007. 104(32): p. 13005-9.
(Continued)

*Primary Examiner* — Hugh Maupin
(74) *Attorney, Agent, or Firm* — Bond Schoeneck & King, PLLC; George McGuire

(57) ABSTRACT

A superresolution STED-NSIM apparatus having an epifluorescence architecture utilizing a 2D structured STED pattern having a N.A. less than a N.A. of the microscope objective and no surface plasmon resonance (SPR) effects. A superresolution STED-NSIM imaging method using a fully deterministic imaging processing method, in which a pre-calibrated set of parameters are used to process all image data.

17 Claims, 9 Drawing Sheets

(51) Int. Cl.
G02B 21/36 (2006.01)
G02B 27/58 (2006.01)
G02B 21/26 (2006.01)
G02B 21/33 (2006.01)
(52) U.S. Cl.
CPC ..... *G02B 21/0032* (2013.01); *G02B 21/0068* (2013.01); *G02B 21/26* (2013.01); *G02B 21/33* (2013.01); *G02B 21/367* (2013.01); *G02B 27/58* (2013.01)

(56) References Cited

U.S. PATENT DOCUMENTS

| | | | |
|---|---|---|---|
| 2012/0104279 A1* | 5/2012 | Reuss | G02B 21/0068 250/458.1 |
| 2015/0009558 A1 | 1/2015 | Engelhardt | |
| 2016/0187259 A1 | 6/2016 | Vicidomini et al. | |
| 2016/0305883 A1* | 10/2016 | Betzig | G02B 21/16 |

OTHER PUBLICATIONS

Auksorius, E., Boruah, B. R., Dunsby, C., Lanigan, P. M. P., Kennedy, G., Neil, M. A. A., and French, P. M. W., "Stimulated emission depletion microscopy with a supercontinuum source and fluorescence lifetime imaging," Opt. Lett. 33, 113-115 (2008).

Berning, S., Willig, K. I., Steffens, H., Dibaj, P., and Hell, S. W.: Nanoscopy in a Living Mouse Brain. Science. 335 (6068): 551-551, Feb. 2012.

Betzig, E., et al., Imaging intracellular fluorescent proteins at nanometer resolution. Science, 2006. 313(5793): p. 1642-5.

Betzig, E., Patterson, G. H., Sougrat, R., Lindwasser, O. W., Olenych, S., Bonifacino, J. S., Davidson, M. W., Lippincott-Schwartz, J., and Hess, H. F.: Nanometer Resolution Imaging Intracellular Fluorescent Proteins at Nanometer Resolution. Science. 313(5793): 1642, Sep. 2006.

Bueckers, J., Wildanger, D., Vicidomini, G., Kastrup, L., and Hell, S. W.: Simultaneous multi-lifetime multicolor STED imaging for colocalization analyses. Opt. Express. 19(4): 3130-3143, 2011.

Cella Zanacchi, F., Lavagnino, Z., Perrone Donnorso, M., Del Bue, A., Furia, L., Faretta, M., and Diaspro, A.: Live-cell 3D super-resolution imaging in thick biological samples. Nature Methods. 8(12): 1047-1049, Oct. 2011.

Chmyrov, A., Keller, J., Grotjohann, T., Ratz, M., d'Este, E., Jakobs, S., Eggeling, C., and Hell, S. W., "Nanoscopy with more than 100,000 "doughnuts,"" Nature Methods 10, 737-+ (2013).

Choi, C. K., Vicente-Manzanares, M., Zareno, J., Whitmore, L. A., Mogilner, A., and Horwitz, A. R.: Actin and alpha-actinin orchestrate the assembly and maturation of nascent adhesions in a myosin II motor-independent manner. Nat Cell Biol. 10(9): 1039-U36, Sep. 2008.

Cox, S., Rosten, E., Monypenny, J., Jovanovic-Talisman, T., Burnette, D. T., Lippincott-Schwartz, J., Jones, G. E., and Heintzmann, R.: Bayesian localization microscopy reveals nanoscale podosome dynamics. Nature Methods. 9(2): 195-200, Feb. 2012.

Ding, J. B., Takasaki, K. T., and Sabatini, B. L.: Supraresolution Imaging in Brain Slices using Stimulated-Emission Depletion Two-Photon Laser Scanning Microscopy. Neuron. 63(4): 429-437, 2009.

Donnert, G., et al., Macromolecular-scale resolution in biological fluorescence microscopy. Proceedings of the National Academy of Sciences of the United States of America, 2006. 103(31): p. 11440-5.

Fouquet, W. Quick Guide to STED Sample Preparation. Leica Microsystems.

Gustafsson, M. G. L., "Surpassing the lateral resolution limit by a factor of two using structured illumination microscopy," J. Microsc. 198, 82 (2000).

Gustafsson, M. G. L., Shao, L., Carlton, P. M., Wang, C. J. R., Golubovskaya, I. N., Cande, W. Z., Agard, D. A., and Sedaty, J. W.: Three-dimensional resolution doubling in wide-field fluorescence microscopy by structured illumination. Biophys. J. 94: 4957, 2008.

Gustafsson, M.G., Nonlinear structured-illumination microscopy: wide-field fluorescence imaging with theoretically unlimited resolution. Proceedings of the National Academy of Sciences of the United States of America, 2005. 102(37): p. 13081-6.

Habuchi, S., et al., Reversible single-molecule photoswitching in the GFP-like fluorescent protein Dronpa. Proceedings of the National Academy of Sciences of the United States of America, 2005. 102(27): p. 9511-6.

Han, K. Y. and Ha, T., "Dual-color three-dimensional STED microscopy with a single high-repetition-rate laser," Opt. Lett. 40, 2653 (2015).

Harke, B., Keller, J., Ullal, C. K., Westphal, V., Schoenle, A., and Hell, S. W.: Resolution scaling in STED microscopy. Opt. Express. 16(6): 4154-4162, 2008.

Hein, B. Live Cell STED Microscopy Using Genetically Encoded Markers. PhD thesis, Max Planck Institute for Biophysical Chemistry, Gottingen, Germany, 2009.

Hein, B., K.I. Willig, and S.W. Hell, Stimulated emission depletion (STED) nanoscopy of a fluorescent protein-labeled organelle inside a living cell. Proceedings of the National Academy of Sciences of the United States of America, 2008. 105(38): p. 14271-6.

Heintzmann, R., "Saturated patterned excitation microscopy with two-dimensional excitation patterns," Micron 34, 283-291 (2003).

Hell, S. W. and Wichmann, J., "Breaking the Diffraction Resolution Limit by Stimulated-Emission—Stimulated-Emission-Depletion Fluorescence Microscopy," Opt. Lett. 19, 780-782 (1994).

Hell, S.W., Far-field optical nanoscopy. Science, 2007. 316(5828): p. 1153-1158.

Hell, S.W., Microscopy and its focal switch. Nature methods, 2009. 6(1): p. 24-32.

Hense, A., Prunsche, B., Gao, P., Ishitsuka, Y., Nienhaus, K, and Nienhaus, G. U.: Monomeric Garnet, a far-red fluorescent protein for live-cell STED imaging. Sci. Rep. 5, 2015.

Hofmann, M., Eggeling, C., Jakobs, S., and Hell, S.: Breaking the diffraction barrier in fluorescence microscopy at low light intensities by using reversibly photoswitchable proteins. PNAS. 102(49): 17565-17569, Nov. 2005.

"Hu, Y. S., Zhu, Q., Elkins, K., Tse, K., Li, Y., and Fitzpatrick, J.: Light-sheet Bayesian microscopy enablesdeep-cell super-resolution imaging of heterochromatin in live human embryonic stem cells— Springer. OpticalNanoscopy. 2013."

Hu, Y.-L, Lu, S., Szeto, K. W., Sun, J., Wang, Y., Lasheras, J. C., and Chien, S.: FAK and paxillin dynamics at focal adhesions in the protrusions of migrating cells. Sci. Rep. 4, 2014.

Huang, B., H. Babcock, and X.W. Zhuang, Breaking the Diffraction Barrier: Super-Resolution Imaging of Cells. Cell, 2010. 143(7): p. 1047-1058.

Huang, B., Wang, W., Bates, M., and Zhuang, X., "Three-Dimensional Super-Resolution Imaging by Stochastic Optical Reconstruction Microscopy," Science 319, 810 (2008).

Juette, M. F., Gould, T. J., Lessard, M. D., Mlodzianoski, M. J., Nagpure, B. S., Bennett, B. T., Hess, S. T., and Bewersdorf, J., "Three-dimensional sub-100 nm resolution fluorescence microscopy of thick samples," Nature Methods 5, 527-529 (2008).

Kanchanawong, P., Shtengel, G., Pasapera, A. M., Ramko, E. B., Davidson, M. W., Hess, H. F., and Waterman, C. M.: Nanoscale architecture of integrin-based cell adhesions. Nature. 468(7323): 580-U262, 2010.

Klar, T., Jakobs, S., Dyba, M., Egner, A., and Hell, S. W., "Fluorescence microscopy with diffraction resolution barrier broken by stimulated emission," in (2000), vol. 97, p. 8206.

Kner, P., Chhun, B. B., Griffis, E. R., Winoto, L., and Gustafsson, M. G. L.: Super-resolution video microscopy of live cells by structured illumination. Nature Methods. 6: 339, 2009.

Kumar, S., Maxwell, I. Z., Heisterkamp, A., Polte, T. R., Lele, T. P., Salanga, M., Mazur, E., and Ingber, D. E.: Viscoelastic retraction of single living stress fibers and its impact on cell shape, cytoskeletal organization, and extracellular matrix mechanics. Biophys. J. 90(10): 3762-3773, May 2006.

Kuo, J. C: Mechanotransduction at focal adhesions: integrating cytoskeletal mechanics in migrating cells- Kuo—2013—Journal of

(56) References Cited

OTHER PUBLICATIONS

Cellular and Molecular Medicine—Wiley Online Library. Journal of Cellular and Molecular Medicine. 2013.
Le Devedec, S. E., Geverts, B., de Bont, H., Yan, K., Verbeek, F. J., Houtsmuller, A. B., and van de Water, B.: The residence time of focal adhesion kinase (FAK) and paxillin at focal adhesions in renal epithelial cells is determined by adhesion size, strength and life cycle status. Journal of Cell Science. 125(19): 4498-4506, 2012.
Lew, M. D., Lee, S. F., Ptacin, J. L., Lee, M. K., Twieg, R. J., Shapiro, L., and Moerner, W. E.: Threedimensional superresolution colocalization of intracellular protein superstructures and the cell surface in live Caulobacter carescentus. PNAS. 108(46): E1102-E1110, 2011.
Li, D., Shao, L., Chen, B.-C., Zhang, X., Zhang, M., Moses, B., Milkie, D. E., Beach, J. R., Hammer, J. A. I., Pasham, M., Kirchhausen, T., Baird, M. A., Davidson, M. W., Xu, P., and Betzig, E., "Advanced Imaging Extended-resolution structured illumination imaging of endocytic and cytoskeletal dynamics," Science 349, -944 (2015).
Meyer, L., Wildanger, D., Medda, R., Punge, A., Rizzoli, S. O., Donnell, G., and Hell, S. W.: Dual-Color STED Microscopy at 30-nm Focal-Plane Resolution. Small. 4(8): 1095, Jul. 2008.
Morozova, K. S., Piatkevich, K. D., Gould, T. J., Zhang, J., Bewersdorf, J., and Verkhusha, V. V.: Far-Red Fluorescent Protein Excitable with Red Lasers for Flow Cytometry and Superresolution STED Nanoscopy. Biophys. J. 99(2): L13-L15, 2010.
Naegerl, U. V., Willig, K. I., Hein, B., Hell, S. W., and Bonhoeffer, T.: Live-cell imaging of dendritic spines by STED microscopy. PNAS. 105(48): 18982-18987, 2008.
Nusz, G. J., Marinakos, S. M., Curry, A. C., Dahlin, A., Hook, F., Wax, A., and Chilkoti, A.: Label-free plasmonic detection of biomolecular binding by a single gold nanorod. Analytical Chemistry. 80(4): 984-989, 2008.
Osseforth, C., Moffitt, J. R., Schermelleh, L., and Michaelis, J., "Simultaneous dual-color 3D STED microscopy," Opt. Express 22, 7028 (2014).
Pavani, S. R. P., Thompson, M. A., Biteen, J. S., Lord, S. J., Liu, N., Twieg, R. J., Piestun, R., and Moerner, W. E., "Three-dimensional, single-molecule fluorescence imaging beyond the diffraction limit by using a double-helix point spread function," PNAS 106, 2995-2999 (2009).
Pellett, P. A., Sun, X., Gould, T. J., Rothman, J. E., Xu, M.-Q., Correa, I. R. J., and Bewersdorf, J., "Two-color STED microscopy in living cells," Biomed. Opt. Express 2, 2364-2371 (2011).
Raymo, F. M.: Photoactivatable fluorophores. ISRN Physical Chemistry. 2012.
Rego, E.H., et al., Nonlinear structured-illumination microscopy with a photoswitchable protein reveals cellular structures at 50-nm resolution. Proceedings of the National Academy of Sciences of the United States of America, 2012. 109(3): p. E135-43.
Rittweger, E., et al., STED microscopy reveals crystal colour centres with nanometric resolution. Nature Photonics, 2009. 3(3): p. 144-147.
Rust, M. J., Bates, M., and Zhuang, X.: Sub-diffraction-limit imaging by stochastic optical reconstruction microscopy (STORM). Nature Methods. 3(10): 793-795, 2006.
Sage, D., Kirshner, H., Pengo, T., Stuurman, N., Min, J., Manley, S., and Unser, M.: Quantitative evaluation of software packages for single-molecule localization microscopy. Nature Methods. 12(8): 717-U37, Aug. 2015.

Schermelleh, L., Carlton, P. M., Haase, S., Shao, L., Winoto, L., Kner, P., Burke, B., Cardoso, M. C., Agard, D. A., Gustafsson, M. G. L., Leonhardt, H., and Sedat, J. W.: Subdiffraction multicolor imaging of the nuclear periphery with 3D structured illumination microscopy. Science. 320(5881): 1332-1336, 2008.
Schmidt, R., Wurm, C. A., Jakobs, S., Engelhardt, J., Egner, A., and Hell, S. W., "Spherical nanosized focal spot unravels the interior of cells," Nature Methods 5, 539 (2008).
Shtengel, G., Galbraith, J. A., Galbraith, C. G., Lippincott-Schwartz, J., Gillette, J. M., Manley, S., Sougrat, R., Waterman, C. M., Kanchanawong, P., Davidson, M. W., Fetter, R. D., and Hess, H. F., "Interferometric fluorescent super-resolution microscopy resolves 3D cellular ultrastructure," PNAS 106, 3125-3130 (2009).
Tønnesen, J., Nadrigny, F., Willig, K. I., Wedlich-Söldner, R., and Nägerl, U. V., "Two-Color STED Microscopy of Living Synapses Using a Single Laser-Beam Pair," Biophys. J. 101, 2545-2552 (2011).
Vicidomini, G., Moneron, G., Han, K. Y., Westphal, V., Ta, H., Reuss, M., Engelhardt, J., Eggeling, C., and Hell, S. W., "Sharper low-power STED nanoscopy by time gating," Nature Methods 8, 571-573 (2011).
Westphal, V., Rizzoli, S. O., Lauterbach, M. A., Kamin, D., Jahn, R., and Hell, S. W.: Video-Rate Far-Field Optical Nanoscopy Dissects Synaptic Vesicle Movement. Science. 320: 246, 2008.
Wildanger, D., Medda, R., Kastrup, L., and Hell, S. W., "A compact STED microscope providing 3D nanoscale resolution," J. Microsc. 236, 35-43 (2009).
Wildanger, D., Rittweger, E., Kastrup, L., and Hell, S. W.: STED microscopy with a supercontinuum laser source. Opt. Express. 16(13): 9614-9621, 2008.
Willig, K. I., Rizzoli, S. O., Westphal, V., Jahn, R., and Hell, S. W.: STED microscopy reveals that synaptotagmin remains clustered after synaptic vesicle exocytosis. Nature. 440: 935, Apr. 2006.
Zhang, H., Zhao, M., and Peng, L., "Nonlinear structured illumination microscopy by surface plasmon enhanced stimulated emission depletion," Opt. Express 19, 24783-24794 (2011).
Zhang, X., et al., Development of a Reversibly Switchable Fluorescent Protein for Super-Resolution Optical Fluctuation Imaging (SOFI). Acs Nano, 2015. 9(3): p. 2659-2667.
Zhao, Z. W., Roy, R., Gebhardt, J. C. M., Suter, D. M., Chapman, A. R., and Xie, X. S.: Spatial organization of RNA polymerase II inside a mammalian cell nucleus revealed by reflected light-sheet superresolution microscopy. PNAS. 111(2): 681-686, 2014.
Bourzac, K., Cell Imaging Beyond the limits, Nature vol. 526, pp. S50-S54, Oct. 2015.
Endesfelder, U. et al., Art and artifacts in single-molecule localization microscopy: beyond attractive images, Nature Methods, vol. 11, Issue 3, Mar. 2014, pp. 235-238.
Raymo, F.M., Photoactivatable synthetic fluorophores, Physical Chemistry Chemical Physics, vol. 15, 2013, pp. 14840-14850.
Heintzmann, Rainer, et al., Subdiffraction resolution in continuous samples; Nature Photonics, vol. 3, Jul. 2009, pp. 362-364.
Zhang et al., Nonlinear structured illumination microscopy by surface plasmon enhanced stimulated emission depletion, Optics Express, vol. 19, issue 24 pp. 24783-24794, published Nov. 18, 2011, copyright 2011 Optical Society of America.
International Search Report and Written Opinion for International Application No. PCT/US2017/049349, dated Jan. 2, 2018, 11 pages.

\* cited by examiner (a)

FIG. 2  FIG. 2  FIG. 2
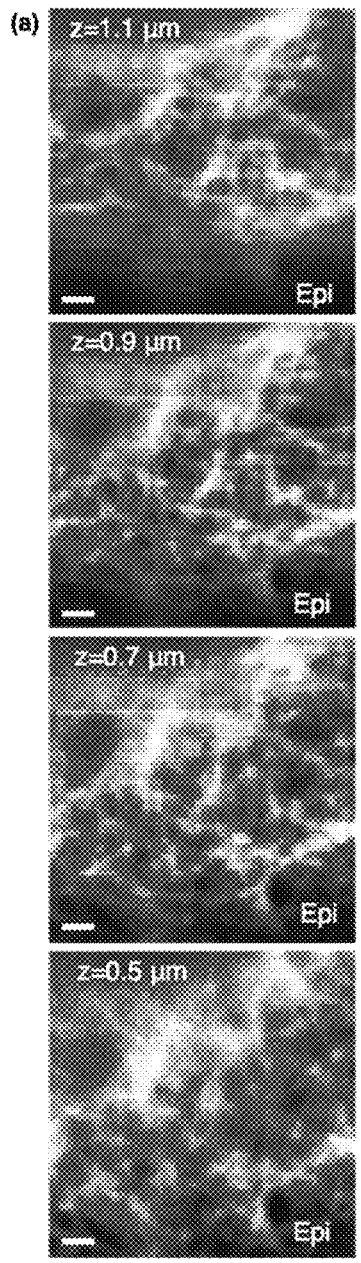
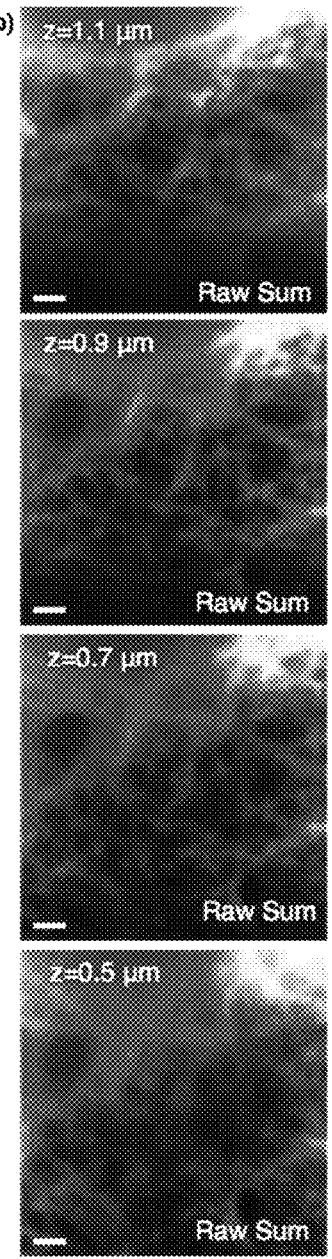
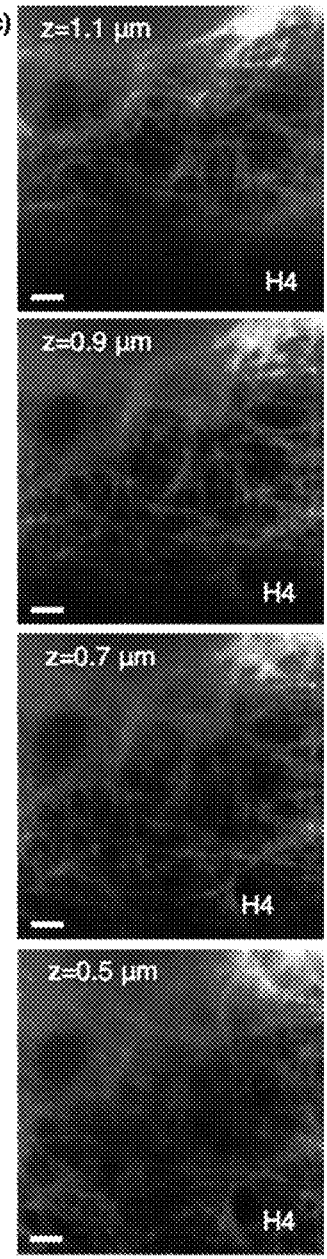

FIG. 5
(a)
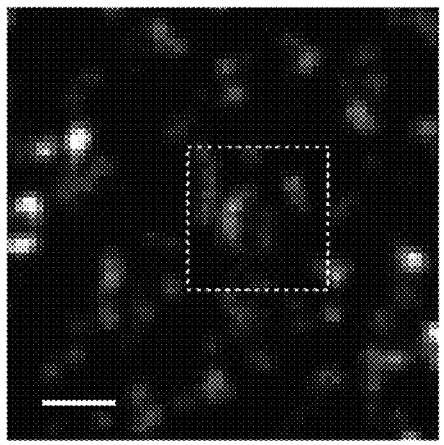
FIG. 5
(b)
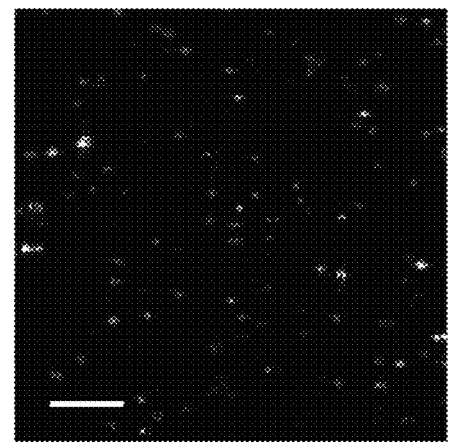
FIG. 5
(c)
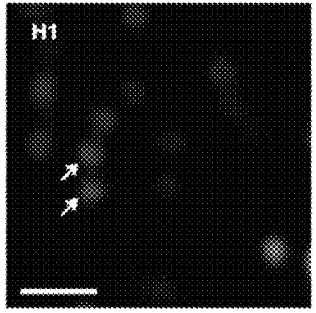
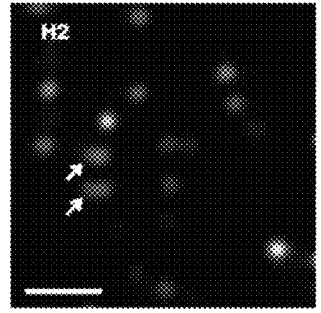
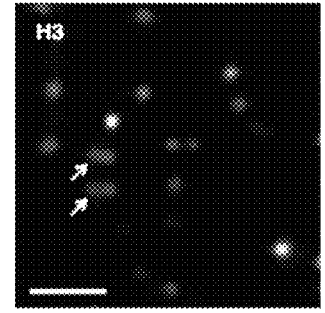
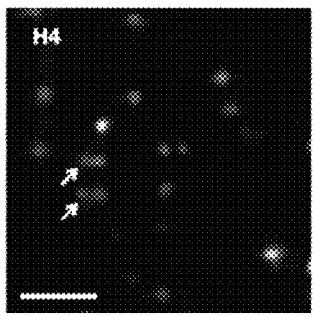
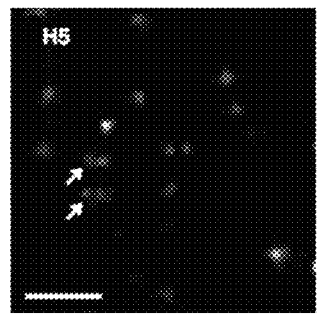
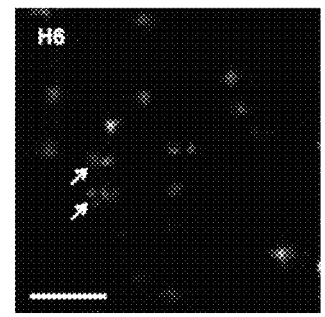

FIG. 6 (a)
FIG. 6 (b)
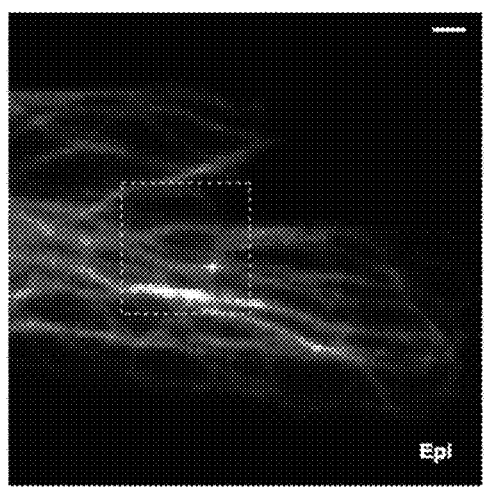
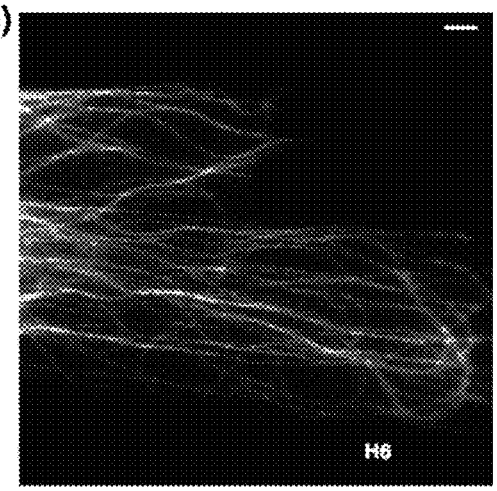
FIG. 6 (c)
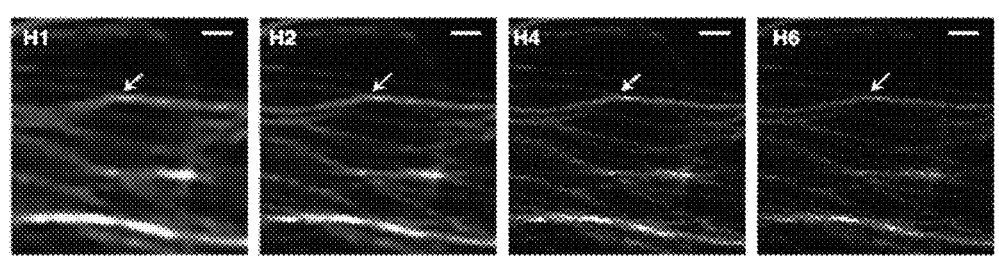
FIG. 6 (d)
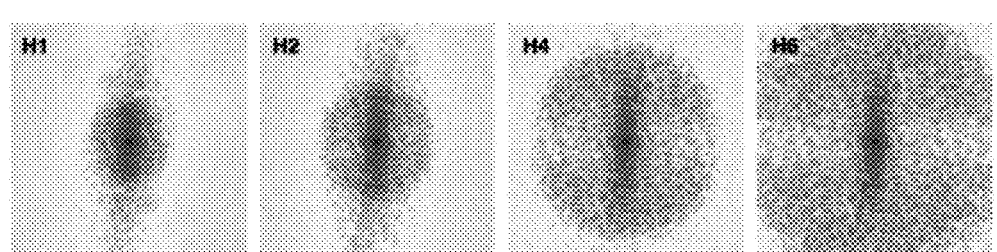

FIG. 11 (a)
FIG. 11 (b)
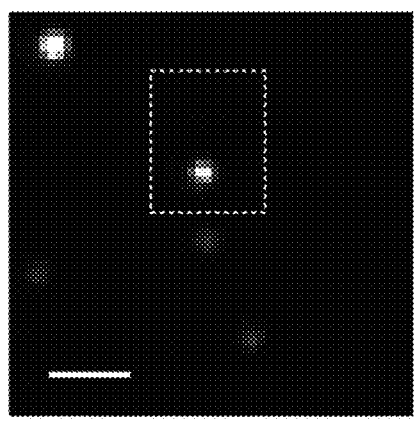
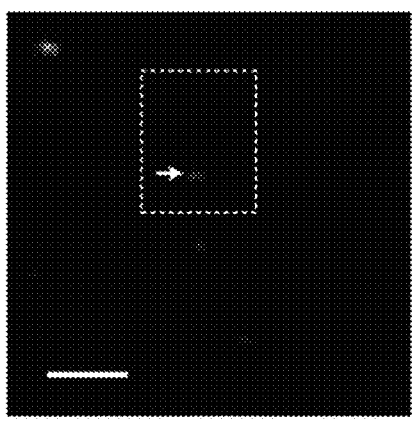
FIG. 11 (c)
FIG. 11 (d)
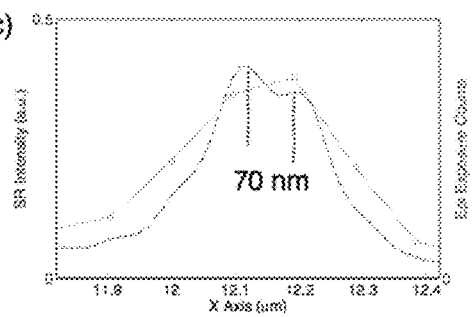
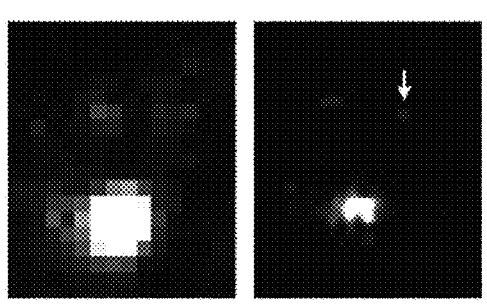
FIG. 11 (e)
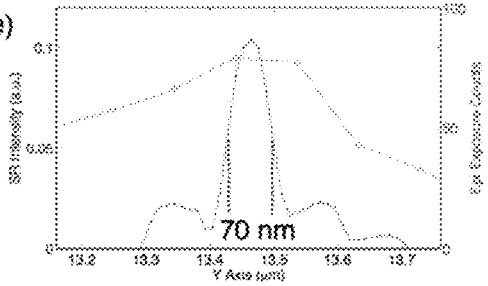

STIMULATED EMISSION DEPLETION NONLINEAR STRUCTURED ILLUMINATION MICROSCOPY (STED-NSIM) APPARATUS, METHODS, AND APPLICATIONS

RELATED APPLICATION DATA

This application is a U.S. National Phase filing of International Application Number PCT/US2017/049349 filed Aug. 30, 2017, which relates and claims priority to U.S. Provisional Application No. 62/381,871 filed Aug. 31, 2016, the subject matter of each of which is incorporated by reference herein in its entirety.

GOVERNMENT FUNDING

This invention was made with government support under Grant No. R21 EB012646, awarded by NIH. The government has certain rights in the invention.

BACKGROUND

Aspects and embodiments of the invention are in the field of imaging optical microscopy; more particularly, structured illumination microscopy (SIM); most particularly, super-resolution-SIM apparatus, methods, and applications.

Since its first demonstration in the early 1990s, super-resolution (SR) microscopy has promised to revolutionize cellular imaging. Fluorescence microscopy techniques are now routinely utilized to decipher dynamic and complex processes with targeted specificity. However, despite advances, SR imaging carries a high price tag in terms of technical considerations and complexity, particularly when it comes to obtaining even higher resolution beyond the diffraction limit. Speed, photon efficiency, label density requirements, photo-toxicity to live cells, as well as the risk of imaging artifacts are all factors to be considered in determining the usefulness of a particular superresolution microscopy method and can influence the practical resolution limit of a superresolution microscope.

More particularly, existing SR microscopy methods often have special requirements on labeling methods and require the user to adjust experimental and image processing parameters accordingly. For example, in single molecule (SM) localization microscopy, it is critical to ensure low spot densities. Because many SM localization microscopy software packages exist for processing SM image data, the user has to weigh the pros and cons of these packages according to the needs of a particular study.

Photo-switching nonlinear SIM (PS NL-SIM), another powerful wide-field SR method, requires a high label density to avoid imaging artifacts. Furthermore, due to the variance of photo-switching rates and yields of both FPs and synthetic dyes throughout a cell, all methods that rely on photo-switching, including SM localization microscopy, PS NL-SIM, and patterned-activation NL-SIM (PA NL-SIM) risk locally varying image quality and information content.

Other 3D SR techniques, such as interferometric photo-activated localization microscopy (iPALM) and point-scanning 3D stimulated emission depletion (STED) microscopy, add significant complexity to instruments. 3D linear SIM requires three-beam interference and 15 frames of exposure for one axial section in order to improve 3D resolution by a factor of two. Expanding the 3D linear SIM approach to nonlinear SIM (NSIM) demands unrealistically high photo-stability from fluorophores.

In PALM/STORM (STochastic Optical Reconstruction Microscopy), resolution is determined by localization precision, i.e., the photon budget, but labeling density and fluorophore switching characteristics can greatly affect the imaging speed and the amount of imaging artifacts in the results.

Nonlinear Structured-Illumination Microscopy (NSIM) refers to a group of full-field superresolution imaging methods that operate under the principle of SIM. According to the SIM theory, any non-polynomial effects on either the fluorophore or the fluorescent emission can be used as the vehicle to unlimited resolution. Excitation saturation, photo-switching depletion (PD), and photo-switching activation (PA) of fluorophores have been previously demonstrated in NSIM. The resolution reportedly reached by a combination of saturation and PA was 45 nm at an excitation wavelength of 488 nm through resolving two harmonic orders above the linear structured illumination term. The history of NSIM suggests that the choice of nonlinear effect has profound consequences, and better performance may be achieved with nonlinear effects that have not been applied to NSIM.

The use of stimulated emission depletion (STED) in NSIM has previously been suggested, however no implementation has been reported. On the surface, STED is an unlikely candidate for NSIM. Although STED refers to a nonlinear photonic effect, its use has been associated with scanning STED microscopy, in which an intensely focused donut beam is essential for breaking the diffraction limit. As NSIM calls for a full-field nonlinear effect, the weak nonlinearity from a diluted STED field appears unrealistic for superresolution. Past work in NSIM may solidify this. Nonlinearities of saturation, PD, and PA are strong under moderate light intensity, but as reported, neither was able to detect more than three harmonic orders above the linear term. Since higher harmonic components of the structured nonlinear effect are key to improving resolution, a weak nonlinear effect will likely be unsuccessful in NSIM.

The inventors have recognized the advantages and benefits of farther diffraction-limited, superresolution imaging, a wider selection of fluorescent labels, and lower cost 3D imaging capabilities than enabled by current NSIM approaches. These benefits and advantages, and solutions to the problems recognized by those skilled in the art are achievable and enabled by the embodied apparatus and method, referred to herein as STED-NSIM.

SUMMARY

An aspect of the invention is a superresolution STED-NSIM imaging apparatus. In an exemplary embodiment, a superresolution STED-NSIM microscope includes a suitable light source adapted to provide an excitation beam along an excitation beam path and a STED beam along a STED beam path; a polarizing beam splitting component disposed in the STED beam path adapted to provide two STED beams having orthogonal polarizations along a first polarized STED beam path and a second polarized STED beam path; a first optical component disposed in the first polarized STED beam path adapted to generate a first STED beam pair in the form of a first 1D STED pattern along a first STED beam pair path; a second optical component disposed in the second polarized STED beam path adapted to generate a second STED beam pair in the form of a second 1D STED pattern along a second STED beam pair path, wherein the first STED beam pair and the second STED beam pair are mutually incoherent; a beam combiner disposed in the first STED beam pair path and the second STED beam pair path, wherein four beams are output along a four STED beam path; an objective lens disposed in an epifluorescence mode in both the excitation beam path and the four STED beam path and a fluorescence emission path and a sample-reflected STED beam path, wherein the four STED beams are combined to form a 2D structured STED pattern, and the 2D structured STED pattern and the fluorescence emission excitation beam are directed towards a sample object; a position-controllable sample object mount; a dichroic mirror disposed in a collinear sample-reflected STED beam path and a sample fluorescence emission path adapted to transmit/reflect the sample-reflected STED pattern/sample fluorescence emission; an image-forming optical component adapted to generate a sample-reflected STED pattern image, disposed in the sample-reflected STED image path downstream of the dichroic mirror; an image detector disposed to receive the reflected STED pattern image and the sample fluorescence emission; and a controller coupled to the image detector adapted to provide a position feedback control signal to the position-controllable sample object mount, wherein an image resolution is sub-diffraction-limited. In various non-limiting, exemplary embodiments the superresolution STED-NSIM imaging apparatus may include some or all of the following features, components, steps, limitations, and/or characteristics, alone or in non-limiting variations appreciated by those skilled in the art:

wherein the suitable light source is a low-coherence, broadband, light source;

wherein the suitable light source is a supercontinuum laser;

wherein the excitation beam is 550 nm–571 nm±16 nm, the STED beam is 716 nm±20 nm, and the pulse duration is 150 ps-350 ps;

wherein the first optical component and the second optical component each comprises a diffraction grating and a lens;

wherein the objective lens is a 60× oil immersion objective having a full numerical aperture, $NA_{OBJ}$, greater than 1.0;

wherein the 2D structured STED pattern has a $NA_{STED}$ less than 1.0, such that the 2D STED pattern has a period from 380 nm–400 nm;

wherein $NA_{OBJ}$ is equal to 1.49 and $NA_{STED}$ is equal to 0.92;

wherein the image-forming optical component is mounted on a moveable translation stage along the optical path;

wherein the light source is pulsed;

the apparatus comprising a superresolution STED-NSIM epifluorescence microscope;

wherein the image detector is an sCMOS camera;

wherein the sample object mount is an inverted sample stage, which allows a water-immersed sample to be imaged through a non-metallized interface without SPR effects.

An aspect of the invention is a superresolution STED-NSIM imaging method. In an exemplary embodiment, the imaging method includes the steps of providing a fluorescence emission excitation beam and four STED beams having a given numerical aperture ($NA_{STED}$); transmitting the fluorescence emission excitation beam and the four STED beams through an objective lens having a $NA_{OBJ}$ to generate a 2D structured STED pattern having a numerical aperture, NASTED, where $NA_{OBJ}$ is greater than $NA_{STED}$; illuminating a sample target with the 2D STED pattern and with the fluorescence emission excitation beam in an epifluorescence mode; propagating a fluorescence emission and a reflected 2D STED pattern from the sample through the objective lens; propagating the reflected 2D STED pattern through an imaging component and forming a reflected 2D STED pattern image thereof on an image detector; and tracking a contrast of the reflected 2D STED pattern image during image acquisition to provide feedback to a sample holder translation stage to actively maintain focus of the sample, wherein, due to the STED depletion effect occurring in out-of-focus layers of the sample, out-of-focus emission under the epifluorescence mode does not reach the emission image detector thus providing superresolution along an axial axis of the sample. In various non-limiting, exemplary embodiments the superresolution STED-NSIM imaging method may include some or all of the following steps, features, components, limitations, and/or characteristics, alone or in non-limiting variations appreciated by those skilled in the art:

further comprising tracking a contrast of the 2D STED pattern image during image acquisition to provide feedback signal to the sample piezo stage to maintain a focus position of the sample;

further comprising providing the $NA_{OBJ}$ from 1.4-1.5 for collecting an emission image and generating a 2D STED pattern at a $NA_{STED}$ between 0.90-0.95;

further comprising processing the 2D STED pattern image using a fully deterministic imaging processing method, in which a pre-calibrated set of parameters are used to process all image data;

in which the pre-calibrated set of parameters are determined by the following steps:

a) measure the 2D STED pattern period and orientation;
b) calibrating a phase shift step size between two separate 1D STED patterns to change the phase of a combined 2D STED pattern in the x- and y-directions, which are orthogonal to the axial z-direction;
c) measuring a STED quenching pattern phase to determine a real phase of the STED quenching pattern;
d) measuring a modulation strength ratio between harmonic orders of the STED pattern's nonlinear effect by analyzing images of the sample consisting of random scattered structures; and
e) determining a bleaching rate map to correct individual raw image set intensities, $I_n(x, y, l)$ (where l is an exposure index), before NSIM reconstruction.

BRIEF DESCRIPTION OF THE DRAWINGS

FIG. 1A schematically shows a superresolution STED-NSIM apparatus layout.

FIG. 2: Z-stack images of ATTO-633 stained tubulin in U2OS cell. The cell nucleus was located above the field of view. Z values are measured from the glass-water interface. FIG. 2(a) Epifluorescence images were blurred by sever out-of-focus emission; FIG. 2(b) Sum of 81 frames of raw STED NSIM exposure is free of out-of-focus emission, which is depleted by a uniform STED field; FIG. 2(c) Applying NSIM image processing on raw frames yields superresolution images at 70 nm lateral resolution (H=4).

FIG. 4 illustrates the use of a bead sample to extract critical image processing parameters.

FIG. 5: Images of 20 nm diameter fluorescent beads randomly immobilized on a coverslip. FIG. 5(a): Diffraction limited epifluorescence image. A large cluster of beads was seen in the highlighted region (scale bar 1 μm); FIG. 5(b): STED NSIM image taken at H=6 (169 exposures, 54 nm resolution) (scale bar 1 μm); FIG. 5(c): Resolution progress during image processing. The bead cluster was resolved as three clusters in linear STED SIM (H=1), and then gradually broke down to individual beads when H=2 to 6 orders were added (scale bar 0.5 μm).

FIG. 6: Images of atto-633 stained tubulin network in U2OS cell. FIG. 6(a): Epifluorescence image (scale bar 1 μm); FIG. 6(b): STED NSIM image taken at H=6 (169 exposures, 54 nm resolution) (scale bar 1 μm); FIG. 6(c): Resolution progression during image processing. As higher harmonic orders were added, junction of tubulin fibers became better defined (scale bar 0.5 μm); FIG. 6(d): Fourier image progression. As higher harmonic orders were added, the Fourier image extended in k-space. These images were plotted in a logarithm false-color scale.

FIG. 9(a): Interfering two coherent laser beams generates a structured pattern extending along the optical axis; FIG. 9(b): Activation effect from a coherent structured illumination extends along the optical axis; FIG. 9(c): Depletion effect from a coherent structured illumination extends along the optical axis; FIG. 9(d): Interfering two beams, which are split from the same low coherent source, generates a structured pattern that is confined in the in-focus layer; FIG. 9(e): Activation effect from a low-coherent structured illumination has spatial structure in the in-focus layer, but quickly degrades to a uniform activation in out-of-focus layers. The uniform background will cause strong artifact in NSIM results; FIG. 9(f): Depletion effect from a low-coherent structured illumination creates spatial structured emission in the in-focus layer, uniformly removes out-of-focus emission and provides the physical basis of 3-D superresolution imaging.

FIG. 11: Images of ATTO633-IgG randomly immobilized to coverslip. FIG. 11(a): Epi fluorescence image is dominated by ultra-bright aggregating IgG particles; FIG. 11(b): STED NSIM images resolved cluster structures of IgG aggregation; FIG. 11(c): Cross section of the cluster demonstrates 70 nm lateral resolution; FIG. 11(d): After re-plot the highlighted region re-plotted in saturated intensity scale, dim IgG particles were seen in both epi and STED NSIM images. Bleaching tests confirm that these dim particles are scattered single molecules (FIG. 7); FIG. 11(e): Cross section of a single IgG molecule shows the molecule is resolved at a FWHM of 70 nm.

DETAILED DESCRIPTION OF NON-LIMITING, EXEMPLARY EMBODIMENTS

Figures 1, 1B, 1C:
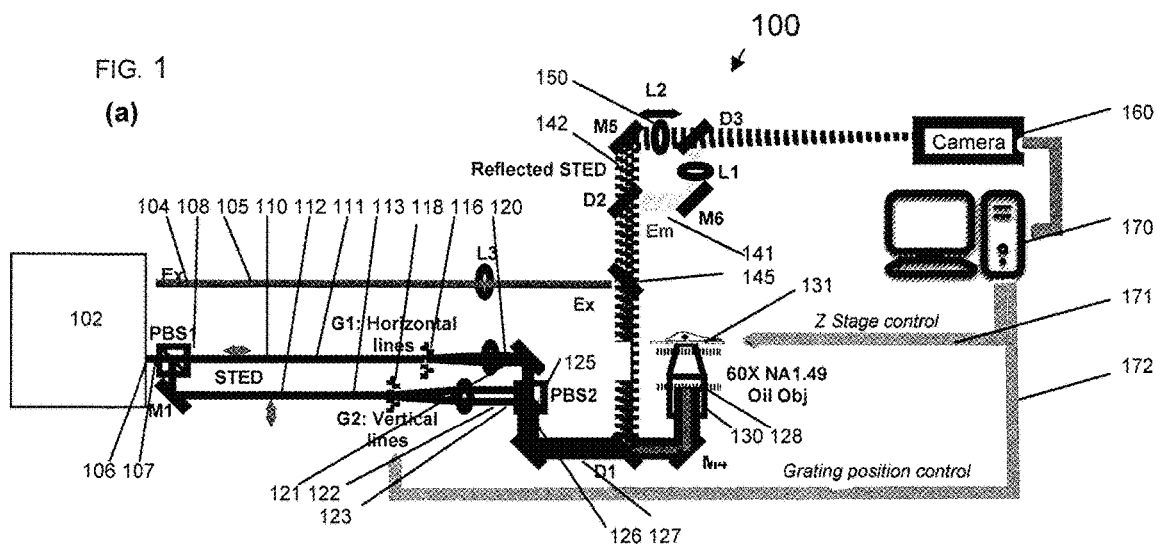
FIG. 1B schematically shows a 3D view of the STED pattern generation and the epifluorescence excitation through the objective lens.
FIG. 1C schematically shows a pupil view of the four STED beams, the epifluorescence excitation beam, and the emission beam, according to illustrative embodiments of the invention.

An optical schematic of a superresolution STED-NSIM microscope 100 is shown in FIG. 1. The STED-NSIM microscope includes a light source 102 adapted to provide a pulsed fluorescence emission excitation beam 104 along a fluorescence emission excitation beam path 105 and a pulsed STED beam 106 along a STED beam path 107. A polarizing beam splitting component 108 is disposed in the STED beam path 107 and provides two STED beams 110, 112 having orthogonal polarizations along a respective first polarized STED beam path 111 and a second polarized STED beam path 113. A first optical component 116 is disposed in the first polarized STED beam path 111 to generate a first STED beam pair 120 (1D STED pattern) along a first STED beam pair path 121, and a second optical component 118 is disposed in the second polarized STED beam path 113 to generate a second STED beam pair 122

(1D STED pattern) along a second STED beam pair path 123. The first and second optical components advantageously are diffraction gratings each followed by a lens. Each of the two diffraction gratings is mounted on a controllable piezo-translation stage to provide phase control of each 1D STED pattern. The light source advantageously is a low-coherence, broad-band, pulsed light source, e.g., a supercontinuum laser, whose output is randomly polarized. The first STED beam pair and the second STED beam pair are mutually incoherent. A beam combiner 125 is disposed in the first STED beam pair path 121 and the second STED beam pair path 123, such that four STED beams 126 are output along a four STED beam path 127. An objective lens 130 is disposed in the fluorescence emission excitation beam path and the four STED beam path so as to irradiate the sample (not part of the invention per se), which is mounted on a piezo-controllable sample translation stage 131, with the fluorescence emission excitation beam 104 and illuminate the sample with a 2D structured STED pattern 128 created by the interference between the two 1D STED patterns in the objective. In an exemplary embodiment the objective lens 130 is a 60× oil immersion objective having a full numerical aperture ($NA_{OBJ}$) greater than 1.0. In an illustrative embodiment, $NA_{OBJ}$=1.49 and the 2D structured STED pattern has a $NA_{STED}$=0.92, providing a 2D structured STED pattern period from 380 nm-400 nm.

Fluorescence emission 141 and the 2D STED pattern 142 reflected from the sample pass back through the objective 130 in a collinear path to a dichroic mirror 145. As illustrated in FIG. 1A, the sample-reflected 2D STED pattern 142 is transmitted and the sample fluorescence emission is reflected. The transmitted 2D STED pattern is imaged by an image-forming optical component 150 on an image detector 160 disposed to receive the reflected 2D STED pattern image and the sample fluorescence emission. In an exemplary embodiment, the image-forming optical component 150, in the form of a tube lens, had a focal length, f, equal to 200 mm. Advantageously, the image-forming optical component 150 is mounted on a controllable, motorized translation stage whereby moving component 150 along the optical path allows the focus depth at the sample to be freely set at a distance from a glass-water interface between the sample and objective lens. In an illustrative embodiment, the image detector 160 is a sCMOS camera; with f=200 mm, the effective image pixel size was 97.5 nm.

A controller 170 is coupled to the image detector. The contrast of the 2D STED pattern image is tracked during image acquisition to provide feedback signal 171 to the sample piezo stage 131 to actively maintain sample focus. Two position control signals 172 are sent to the first optical component 116 and the second optical component 118, respectively, for phase control of the two 1D STED patterns. In use, the superresolution STED-NSIM microscope 100 provides sub-diffraction-limited image resolution.

FIG. 1B is a 3D view of the STED pattern generation from the objective lens and the epifluorescence excitation (i.e., an object in an optical microscope is irradiated by normal incident light and fluorescence is viewed from the same side).

FIG. 1C is a pupil view of the four STED beams, the excitation beam, and the fluorescence emission beam. The broadband STED beams centered at 716 nm enter the objective lens at NA=0.92, and form a 2D grid pattern 128 at 396 nm periods.

STED-NSIM Imaging

In an illustrative embodiment, image data were taken with 0.7 mW excitation power and 9 mW total STED power at the sample. The excitation power was spread to a 24 μm diameter area, and the STED field was 12 μm in diameter. The average intensity of the STED field was 8 $MW/cm^2$, and the estimated instantaneous intensity of STED field was 40 $MW/cm^2$. All image data were taken with 30 ms camera exposure plus 11 ms for image readout and STED pattern phase-shifting.

The microscope 100 used a 2D structured STED pattern instead of a rotating 1D structure pattern to generate super-resolution image. The image reconstruction theory of the 2D method was presented in Zhang, H., Zhao, M., and Peng, L., *Nonlinear structured illumination microscopy by surface plasmon enhanced stimulated emission depletion*, Opt. Express 19, 24783-24794 (2011), incorporated by reference herein. That reference, however, relied on total internal reflection fluorescence (TIRF) illumination and surface plasmon resonance (SPR) effects at a silver-based interface of the sample. The 2D method used two incoherent 1D structured STED patterns overlaid orthogonally to create an x-y grid pattern, and phase shifts the pattern in both directions during image acquisition. Compared to the 1D rotating method, the embodied 2D approach requires fewer exposures to fill a Fourier space image isotropically. The 1D rotation method would need 3H(H+1) exposures whereas the 2D method needs $(H+1)^2$ exposures. When H is larger than 2, the embodied 2D method enables faster imaging.

Because the supercontinuum source 102 (FIG. 1A) is randomly polarized, two polarizations of the source are incoherent. Thus in the STED-NSIM microscope 100, the STED beam was split into two polarizations; each was then used to create a 1D pattern by passing through a grating (116, 118). The two 1D STED patterns were then recombined orthogonally to form the 2D structured STED pattern 128. Two close-loop piezo stages were used to shift gratings and consequently shift the pattern phase in the x- and y-directions.

The sample was mounted in a fabricated inverted sample stage with 3D piezo position control. The sCMOS camera 160 was used to capture the emission image and the reflected 2D STED pattern image 142 from the sample's glass-water interface simultaneously. The 2D STED pattern image 142 was formed via a tube lens 150 mounted on a motorized translation stage (L2 in FIG. 1A). A Lab VIEW-based image software program was developed to capture both images in a split view fashion. The contrast of the imaged STED pattern was analyzed in real-time and fed to a PID feedback thread (controller 170/signal 171 in FIG. 1A) within the imaging software, which actively maintained the sample focus (z-axis). Moving the pattern imaging tube lens 150 allowed the focal tracking depth oat the sample to be shifted by a desired distance. The distance between a cell slice image and a basal surface of the sample (see FIG. 2) was precisely controlled optically through the position of lens 150.

Figure 3:
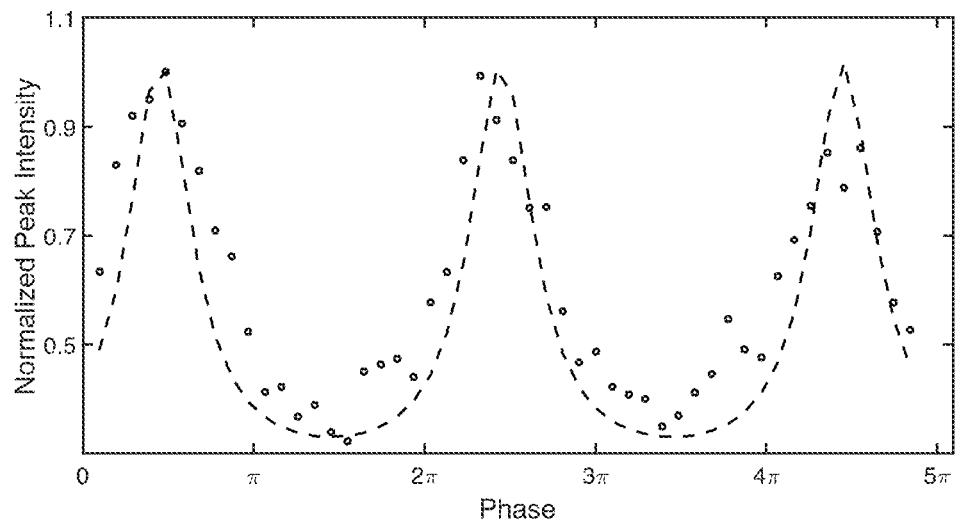
FIG. 3 graphically illustrates emission from a single 20 nm bead under a scanning 1-D STED pattern. The dashed line is a fitted curve of $[1+I_{sat}(0.5+0.5\ m\ \sin\ \phi)]^{-1}$, with the peak STED field strength $I_{sat}$=10.4 and interference contrast m=0.945. Through the fitting, the peak to-valley strength of the 1D STED field was estimated to be $0.3\text{-}10.4^{I_{sat}}$. The 2D STED field, which is an overlay of two orthogonal 1D fields, was estimated at $0.6$-$20.8^{I_{sat}}$. The average strength of the 2D STED field is at $10.8^{I_{sat}}$.

The 2D STED pattern 128 was generated at a $NA_{STED}$=0.92, which is significantly smaller than the 1.49 $NA_{OBJ}$ of the objective lens. $NA_{STED}$=0.92 was chosen because: (1) it allows a high quality reflected image of the 2D STED pattern 142 to be seen in the diffraction limited camera, and (2) Contrast measurements, illustrated in FIG. 3 indicate that patterns using higher NA had inferior pattern contrasts.

The excitation beam was delivered to the sample in an epifluorescence mode (i.e., an object in an optical microscope is irradiated by normal incident light and fluorescence is viewed from the same side) at NA=0. Because the STED depletion effect occurs in out-of-focus layers, out-of-focus layer emission under the epifluorescence mode does not reach the camera. The system could potentially use a light-sheet illumination mode so that structures in out of focus layers will not be bleached, but would require a drop in the emission detection NA because of geometrical constraints of the light-sheet mode.

Imaging Processing Method

The embodied STED-NSIM imaging method utilized a fully deterministic imaging processing method, in which a pre-calibrated set of parameters are used to process all image data. Unlike previous NSIM studies, neither a regression algorithm nor empirical parameters were used in the process. The pre-calibration involves five steps:

1. Measure STED Pattern Period and Orientation

Periods and orientations of two orthogonal 1D STED patterns were calculated directly from reflected pattern images. The k-vectors of the two 1D patterns do not need to be precisely orthogonal as long as they are at 90°±2°.

2. Calibrate Piezo Phase Shift Step Size

Two voltage-signal-controlled piezo-powered translation stages coupled to diffraction gratings 116, 118, respectively, used to shift the 2D STED pattern x-y phase were driven by analog voltage step signals under the control of the LabVIEW system software. To calibrate the signal voltage vs. phase shift size, a sequence of pattern images were taken under uniform stepping voltages. Phase values of pattern images were calculated and fitted with a linear function.

3. Measuring the STED Quenching Pattern Phase

Figure 4A:
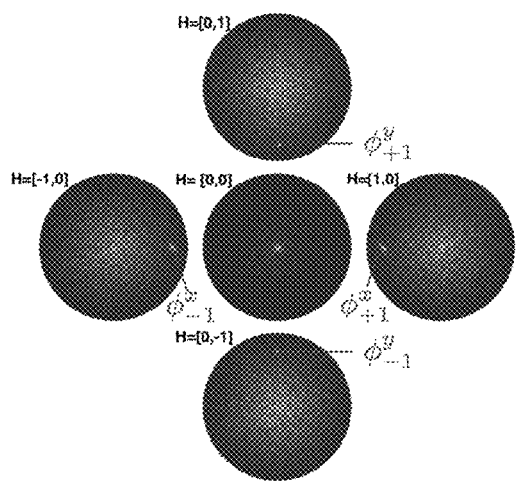
FIG. 4(a) illustrates the step of measuring the 2D STED pattern phase. The figure shows k-space patches of a bead sample that are waiting to be merged into a superresolution k-space image. The DC component (k=0) is visible in five orders H=[0,0], [−1, 0], [1,0], [0,−1], and [0,1], where the first index is the harmonic order in the x-direction and the second index is the harmonic order in the y-direction. Phases of the DC component in the [−1, 0] and [1,0] orders are conjugated $\phi_{-1}^{x} = -\phi_{+1}^{x}$; similarly, $\phi_{-1}^{y} = -\phi_{+1}^{y}$. The pattern phases are calculated as $\phi^{x} = (\phi_{+1}^{x} - \phi_{-1}^{x})/2$ and $\phi^{y} = (\phi_{+1}^{y} - \phi_{-1}^{y})/2$.
Figure 4B:
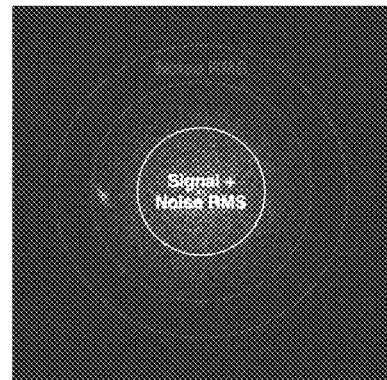
FIG. 4(b) illustrates the step of measuring the modulation strength of the harmonic orders. Because the bead sample is a random structure, the ideal k-space image of the bead sample should by a "white noise" 2D spectrum. Thus the modulation strength of each harmonic order can be measured by k-space signal RMS values within the OTF. The measurement calculated two RMS values, $RMS_{S+N}$ from the k-space area corresponding to NA<0.8 and $RMS_N$ from a ring area beyond the maximal NA. The signal RMS value was calculated as $RMS_S = \sqrt{RMS_{S+N}^2 - RMS_N^2}$, which is linear to the modulation strength of the harmonic order. The measurement was repeated on more than 10 sets of bead image data. The average modulation strength value was used in image processing.

Due to the experimental split view arrangement, the absolute phase of the sample-reflected 2D STED pattern 142 had an unknown offset from the phase of the 2D STED quenching pattern 128 in the emission image, and could not be used for imaging processing; therefore, the 'real' or actual phase of the 2D STED quenching pattern 128 was measured from the emission image of a standard fluorescent sample. In STED NSIM, we used 20 nm beads randomly immobilized on a coverslip as the standard sample due to its highly reproducible random structures. More than 10 sets of bead images were first taken. Raw images were processed half-way according to the standard NSIM method, to the point that individual patches of k-space images were formed, as illustrated in FIGS. 4(a) and 4(b). The next step would be merging these patches into a superresolution k-space image; however, the merging step requires knowing the phase of the STED pattern so that the patches could be merged in phase. To retrieve the phase value, we compared the phase difference between DC components (k=0) visible in both +1 and −1 orders of the k-space patches, which according to SIM theory should be twice of the phase value of the STED pattern (FIG. 4(a)). For each bead image set, an x-y vector phase value was measured. The average value of more than 10 image sets was used in image processing. The above phase measurement method requires: (1) that the pattern period is smaller than the diffraction limit, so that there is an overlapping region between +1 and −1 orders of the k-space patches, and (2) that the sample has sufficient average brightness so that the DC component has a high SNR and the phase of the DC component is accurate. (1) was achieved by intentionally shrinking the pattern NA; (2) was achieved by a proper protocol to immobilize the bead in a high surface density as seen in FIG. 5. In theory, all k-components within the overlapping region could be used to calculate the phase, but because only the DC component is guaranteed to exist in all samples, the algorithm therefore used only the DC component.

4. Measure the Modulation Strength Ratio Between Harmonic Orders

Because the bead sample is a random structure, the ideal k-space image of a bead sample should by a "white noise" 2D spectrum. Thus the modulation strength of each harmonic order can be measured by the k-space signal RMS value from a bead image set (see FIG. 4(b)). For each bead image set, a 2D array of modulation values was measured. The average array of more than 10 image sets was used in image processing.

5. Measure the Bleaching Rate Map

Because the bleaching rate varies with the excitation intensity, we found that uniform bleaching correction is not suited for STED NSIM. In locations where the actual bleaching rate deviated from the uniform value, artifacts were seen. To calculate a bleaching map over the entire field of view, at least 20 sets of raw cell data sets $I_{n=1\sim20}(x,y,l)$, where l is the exposure index, were merged into a single raw set $\bar{I}(x,y,l)$. Bleaching curves of all pixels are fitted with the exponential decay model to obtain a per exposure bleaching map. The map was used to correct each individual raw image set $I_n(x,y,l)$ before NSIM reconstruction.

The NSIM reconstruction process was discussed id. A MatLab program was written to process image sets.

Additional Discussion

In the superresolution STED-NSIM microscope 100 shown in FIG. 1, a 1-MHz repetition-rate supercontinuum laser provided both the uniform excitation illumination at 571 nm and the 2D structured STED quenching field at 716 nm. With a moderate STED power of 20 mW spread over the entire field of view, the embodied STED NSIM apparatus and method were able to resolve up to five orders above the linear term (harmonic order H=6). FIGS. 5(a,b,c) show the comparison between the diffraction-limited epifluorescence image (FIG. 5a) and the superresolution image (FIG. 5b) of fluorescent beads (FluoroSphere Crimson 20 nm, Thermo Fisher) immobilized on coverslips. As more harmonic orders were added during image reconstruction (FIG. 5c), seemingly singlet beads in the epi-image were revealed as clusters of beads. More details about these clusters were added as the harmonic order reached the highest order.

Similarly, in an image of ATTO633-antibody stained microtubules in fixed U2Os cells (FIGS. 6(a,b,c,d)), spatial locations of microtubule junctions became better defined as higher order harmonics were added. With a 2D STED pattern period of 396 nm, and an objective lens $NA_{OBJ}$ of 1.49, the resolution limit of H6 was 54 nm at the 700 nm wavelength. 169 exposures were needed for producing one image. At 41 ms per exposure, the acquisition time needed to reach 54 nm lateral resolution was 6.9 seconds. Faster imaging speeds are possible at lower resolution as indicated in Table 1. The STED field strength used for achieving 54 nm resolution was at a low 10.8 $I_{sat}$ in average (FIG. 5) and yet the superresolution effect reached by our STED NSIM is higher than reported PA NSIM: the 54 nm resolution in our STED NSIM is roughly 18% of the diffraction limit with 716 nm STED light and 1.49 $NA_{OBJ}$ lens; while the 45 nm resolution in PA NSIM is roughly 31% of the diffraction limit with 405 nm PA light and 1.7 NA lens.

TABLE 1

Exposure number, total time and resolution scaling

| H | Exposure number | Total time needed at 41 ms per exposure (s) | Resolution (nm) |
|---|---|---|---|
| 1 (Linear SIM) | 9 | 0.36 | 168 |
| 2 | 25 | 1.03 | 118 |
| 3 | 49 | 2.00 | 91 |
| 4 | 81 | 3.32 | 74 |
| 5 | 121 | 4.96 | 62 |
| 6 | 169 | 6.93 | 54 |

The success of STED NSIM derives from a fundamental advantage in SNR. SIM assumes fluorescence emission of a given sample is the continuous response of the illumination function. In reality, the photon emission process and the photo-switching process (PD or PA) are both stochastic and have additional Poisson shot noise of $\sqrt{N}$. For the photon emission process, N refers to the number of photons. For the photo-switching process, however, N refers to the number of fluorophores, because fluorophore photo-switching is a photochemical reaction. The SNR of an ideal experiment is $\sqrt{N}$. In a fluorescence microscopy experiment, the number of photons is always much larger than the number of fluorophores. Therefore, when average photon counts are the same, NSIM methods based on photonics nonlinear processes have a theoretical SNR advantage over those based on photochemical processes.

For an imaging method being SNR limited by the number of fluorophores, the direct consequence is that a low density labeled sample will not be imaged properly. Because a SIM superresolution image is the product of sophisticated image processing, low SNR may manifest as artifacts instead of random noise in the final result. Strong imaging artifacts from scattered single molecules were indeed previously reported in PD NSIM, even though those molecules appeared sufficiently bright. When SNR is label density-limited, boosting exposure or using a brighter label will not improve the result. The label density limit is likely the ultimate barrier that prevented PD and PA SIM from higher resolution.

On the other hand, if the above argument about SNR limit is valid, NSIM based on photonics nonlinear processes should be purely photon shot noise-limited and able to produce single molecule images that are free of artifacts. However, theoretical advantages often do not materialize in experiments due to various practical limitations. For example, saturation excitation is a photonic process that in theory should be able to reach single molecule sensitivity. However, under saturation excitation single molecules will bleach before the image acquisition is completed.

Figure 7:
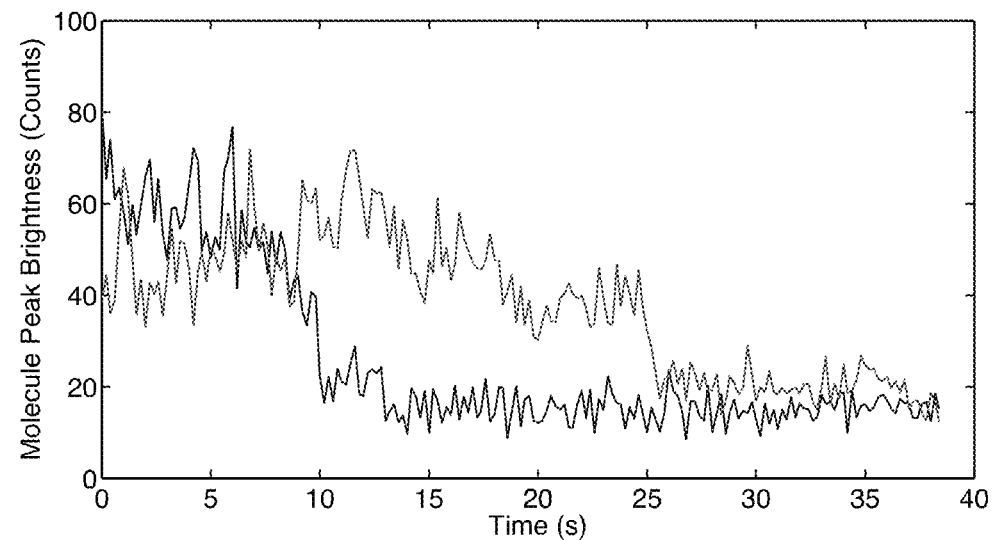
FIG. 7: Bleaching test of single IgG molecules. IgG particles with low brightness similar to what are seen in FIG. 11 were selected and monitored under continuous epi-imaging. Step-like bleaching was observed in the intensity-time trace and confirmed that these particles were single molecules.

To test whether STED NSIM can truly perform at the single molecule limit, we randomly immobilized ATT0633-IgG on coverslips, forming both bright aggregated particles and dim IgG molecules barely visible in the epi image, as illustrated in FIGS. 11(a-d). In the superresolution image, bright particles and dim molecules were both resolved at 70 nm resolution. Bleaching tests on molecules of similar brightness confirmed that these dim IgG molecules were indeed single molecules as indicated graphically in FIG. 7. As expected, single molecules were presented by STED NSIM without artifacts.

In addition to the differences between photonic and photochemical effects, there is also a theoretical SNR difference between depletion and activation NSIM. When trying to improve the resolution by strengthening the nonlinear effect, depletion generates an overall darker image with less shot noise, which allows higher harmonic orders to be detected, whereas activation generates a brighter image with higher shot noise and leads to a self-limited SNR on high harmonic orders.

Unlimited resolution NSIM is only possible with a depletion effect. Based on such notion, when a photo-switching effect was first used in NSIM, photo-switching depletion (PD) instead of activation (PA) was used. However, depletion processes are often a double-sided sword. PD and STED deplete away photons, whereas photo-activation processes detect all photons emitted by the sample. The debate on depletion vs. activation is further complicated by other factors; e.g., because PD is a much slower process than PA, if one has to perform NSIM with the photo-switchable effect, PA is no doubt the better choice, even though PD has the theoretical potential for better resolution. Advantageously, STED is an instantaneous depletion process and the speed of STED NSIM is only limited by the photon shot noise. The fact that STED will deplete the fluorescence signal away can be a drawback in time-lapse imaging applications; however, many point scanning STED time-lapse imaging studies have demonstrated that with highly photostable labels, such drawbacks of the STED effect can be overcome. Furthermore, depletion NSIM also has an unexpected advantage, which is low-cost axial superresolution.

In all current superresolution methods known to the inventors, breaking the diffraction limit in both the axial (z) and lateral (x-y) directions requires substantial cost in lateral resolution and/or instrument complexity. For example, when applying PSF engineering to localize single molecules in the axial dimension, the same limited photon information was used to localize molecules in all three dimensions, consequently compromising the lateral resolution. Other 3D SR techniques, such as iPALM and 3D S-STED, add significant complexity to instruments, making it much less accessible. 3D linear SIM require three beam interference and 15 frames of exposure for one axial section in order to improve 3D resolution by a factor of two. Expanding the 3D linear SIM approach to NSIM will demand unrealistically high photo-stability from fluorophores. Per the embodied invention, by using a structured depletion pattern from a low-coherence source, STED-SIM has natural super z-section resolution and allows 3D SR imaging with no compromise in lateral resolution and no instrument modifications.

Figure 9:
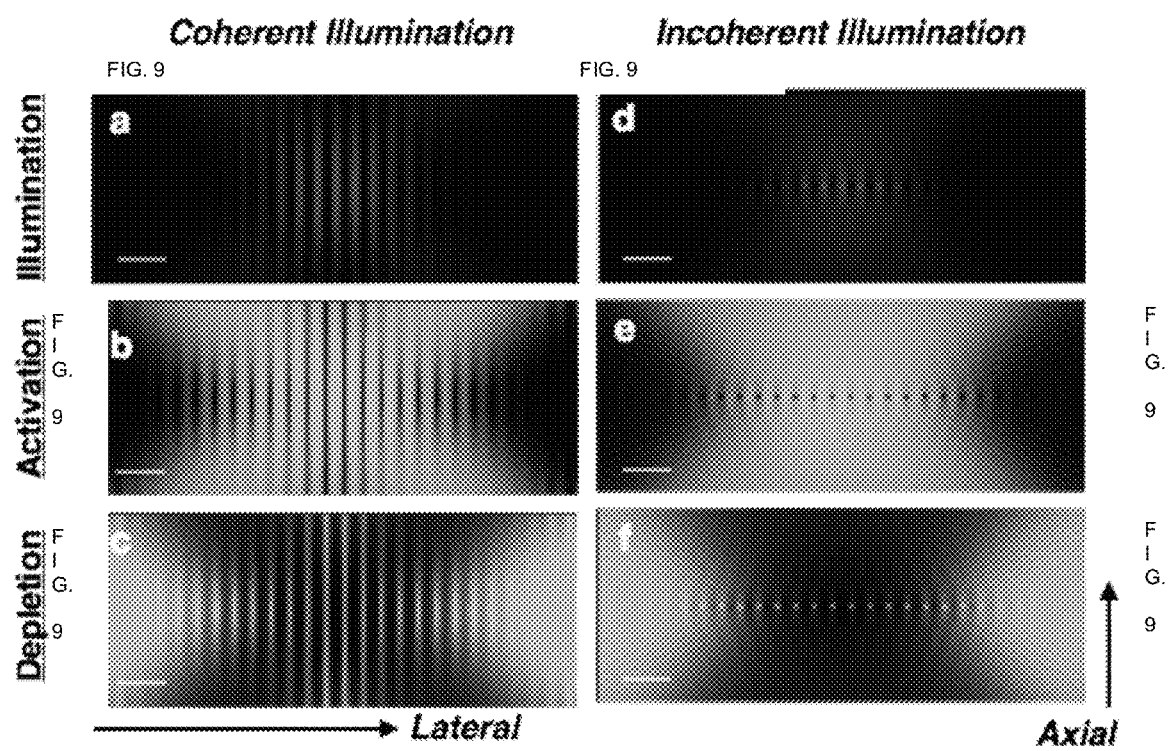
FIG. 9: Theory basis of 3D superresolution with low-coherent depletion NSIM.

Previously all NSIM methods opted to use CW lasers to generate illumination pattern through two-beam interference. Due to the strong coherence of CW lasers, the interference pattern maintains high contrast along the optical axes as long as the two beams overlap. Therefore, fluorescence from an extended distance along the optical (z) axis contributes to the final signal and no super z-sectioning is possible, as illustrated in FIGS. 9(a-f). In the STED NSIM microscope, the illumination is from broadband-pulsed light source with very low coherence. Therefore, the two-beam interference pattern will quickly lose contrast in out-of-focus layers (FIG. 9(d)). Since STED is a nonlinear effect, a small decrease in interference contrast causes quick deterioration of harmonic signals, providing the physical foundation for sub-diffraction z-section.

However, signal section alone is not sufficient to achieve axial superresolution. If an activation effect is used, fluorescence from out-of-focus layers adds a bright background to raw image data, overwhelming the super-sectioned signal (FIG. 9(e)) and causing strong image artifacts in the super-resolution image. In fact, activation NSIM requires the use of axially-confined excitation, such as TIRF or lattice light sheet illumination to avoid such artifacts. None of these approaches is ideal. TIRF limits the image to a thin basal layer. Lattice light sheet illumination causes a significant drop in resolution because the geometry of light sheet illumination prohibits an objective lens with a desired highest NA to be used.

Figure 8:
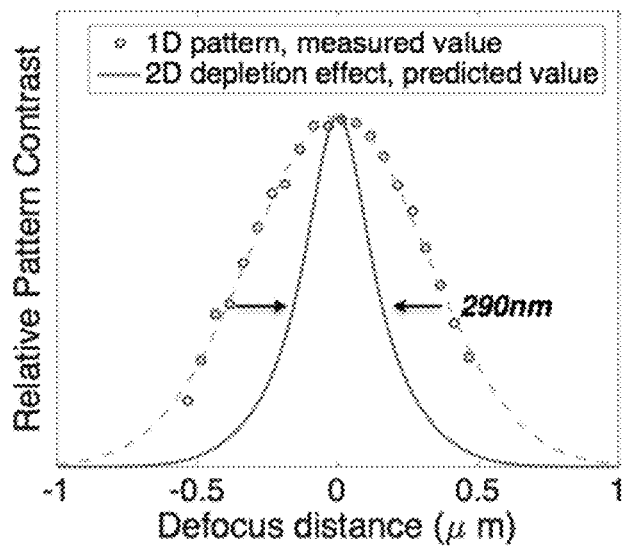
FIG. 8: z-axis resolution of STED NSIM. Measured contrasts of 1D STED pattern decreases in out-of-focus layer (scattered point, fitted with a Gaussian dashed curve). The FWHM of contrast is 700 nm, which matches the value predicted by diffraction theory. The structured depletion effect, however, decreases faster than the pattern contrast (solid curve). At an average field strength of $10^{I_{sat}}$, the contrast of a 2D structured STED effect drops to half at 145 nm away from the focal depth. The z-resolution of images in FIG. 2 is therefore estimated to be 290 nm. Increasing the STED strength will improve the z-resolution as well as the lateral resolution.

In STED NSIM, out-of-focus emission is depleted by a uniform STED field (FIG. 9(f)), and only useful in-focus signal will reach the camera. Thus, the embodied STED NSIM microscope can image an axial section of 3D structure under a simple epi-excitation mode. FIGS. 2(a-f) show a four-slice z-stack image set taken from an ATTO-66 stained tubulin network near the cell nucleus. Due to the rich 3D structure, images from the traditional Epi fluorescence image mode were blurred by server out-of-focus emission. In the sum image of 81 frames of raw STED NSIM data, out-of-focus emission was depleted by the uniform STED field, and sectioned structures were revealed with diffraction-limited lateral resolution. Applying NSIM image process algorithm to raw data produces a set of z-stack images with 74 nm lateral resolution, which contains much more detail about the tubulin network structure within the section. The thickness of the super z-section is determined by the strength of the nonlinearity. We estimated that currently at $10\ I_{sat}$, our STED-SIM has a z-section of approximately 290 nm (FIG. 8), less than half of the diffraction-defined depth of focus. Indeed, z-slices separated by 200 nm show gradual structure changes in 3D tubulin structure at different depths of the cell (FIG. 2). Remarkably, STED NSIM obtained these 3D superresolution images without modifying the 2D Epi imaging system or changing the image processing method. The axial superresolution came entirely by choosing a more advantageous nonlinear effect in NSIM.

Figure 10:
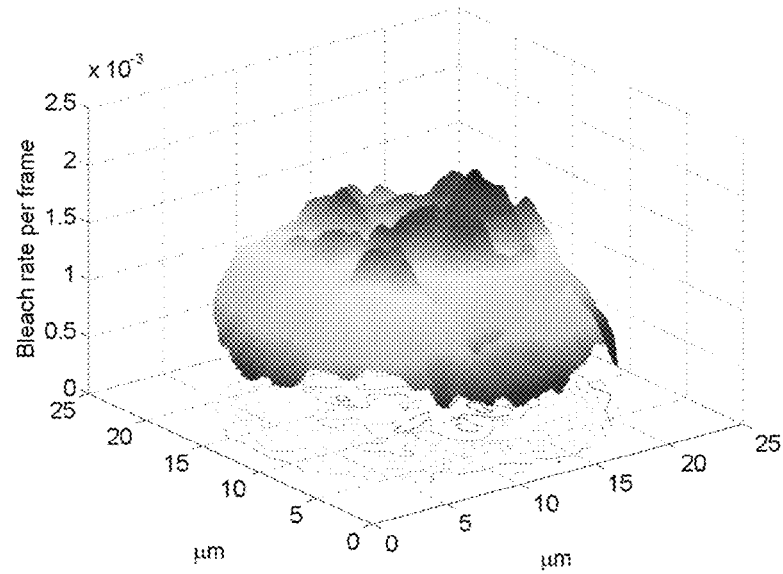
FIG. 10: Bleaching rate map of ATTO-633 stained U2OS tubulin under 41 ms per cycle exposures with both the excitation and the STED beam active. The map was calculated by summing raw frames of more than 20 image sets, and fitting pixel brightness of consecutive frames with an exponential decay curve. During NSIM image processing, individual image sets were bleaching corrected according to the map before being subjected to superresolution image reconstruction. The bleaching map follows the spatial distribution of the excitation field, which is a multi-spatial-mode bean spread over an area of 24 μm in diameter. The area in the middle of the view did not show significantly elevated bleaching, indicating that the addition of the STED field (12 μm in diameter) did not cause significant bleaching.

Practical limitations still exist in STED NSIM though. The single molecule image in FIG. 11 was taken with 81 exposures at H=4, whereas images from beads and cells in FIGS. 5 and 6 were obtained with 169 exposures at H=6. The single molecule sample offered a very limited photon budget, and the number of exposures had to be cut back to avoid significant bleaching. SIM assumes a constant sample under changing illumination patterns. Bleaching of the sample has to be corrected during imaging process. Bleaching rates vary between samples. Whereas bead samples exhibited unmeasurable bleaching under the STED NSIM microscope, ATTO-633 stained cell tubulin networks suffered an average bleach rate of 0.1% per 41 ms exposure, as illustrated in FIG. 10. However, when label density is extremely low, random bleaching of individual fluorophores cannot be fully described by the continuous bleaching model. In other words, stochastic bleaching of individual fluorophores may become the major source of noise in low density labeled samples. To decrease stochastic bleaching behavior in low label density samples, fewer exposures were used to obtain FIG. 11(a, b, d).

In high density labeled samples, practical limitations still apply. Attempts to further improving the resolution were made but resulting images from bead samples often have artifacts, which are not likely caused by bleaching, because bead samples did not have noticeable bleaching afterwards. Instead, artifacts are likely caused by sample lateral drifting, because the microscope system can only actively track the sample's focus depth but not lateral position. As imaging at higher resolution requires more exposures and longer acquisition time, the microscope's mechanical stability needs to be improved in order to reach even higher resolution than demonstrated.

In theory, the resolution of STED NSIM could be improved by using the maximal $NA_{STED}$ to produce the diffraction limited structured pattern. The 396 nm period used here is far from the diffraction limit of the $NA_{OBJ}$ 1.49 lens. The choice was intentional, because a low-period pattern allows direct viewing of the STED pattern reflected from the sample's glass-water interface, whose contrast provides a way to implement active focal tracking, which is highly advantageous for all 3D superresolution microscopes. Most importantly, direct viewing of the pattern permits precise measurements of the pattern phase, orientation, and spatial frequency values, and the relative strength of harmonic orders. These parameters are critical for artifact-free image reconstruction. Previously, regression algorithms and empirical approaches were used on real NSIM image data to obtain such information when the illumination pattern was not easily accessible. We found that the effectiveness of using a regression algorithm depends greatly on the structural characteristics and brightness of the sample, and results were not as reliable as direct measurements. Thus a choice was made to compromise resolution for robust artifact-free image processing with all predetermined parameters.

It is notable that the STED field intensity used in STED NSIM is one magnitude lower than what point scanning STED used to reach similar resolution (few tens of $MW/cm^2$ vs several hundred $MW/cm^2$). Furthermore, the STED NSIM microscope uses a 2D grid-shape STED field to quench the sample. The same pattern was interpreted as thousands of independent "doughnuts" in parallel RESOLFT. Accidentally, the pattern period we used (396 nm) is similar to that of parallel RESOLFT. But despite using a much weaker nonlinear effect, STED NSIM performed at a higher resolution than parallel RESOLFT. This performance difference is due to different image forming models employed by NSIM vs. point scanning STED. NSIM processes images under a strict Fourier image processing theory, whereas point scanning STED treats the doughnut-shaped point spread function (PSF) as a simple digital scanner probe and processes images in a pixelated image space. In parallel RESOLFT, the periodic spatial relationship of "thousands of donuts" was further ignored. This spatially digitalized and simplified imaging model leads to incomplete information recovery and inferior resolution under similar experimental conditions.

As point scanning STED has been very successful in live imaging, especially with time-gate STED detection that improves resolution dramatically, it is reasonable to expect STED NSIM, using much less light intensity, will be applicable to live imaging. The 3D resolution of STED NSIM could be further improved by using time-gated exposure, because in STED NSIM, the axial and the lateral resolution are both tied to the detection of the structured nonlinear depletion effect. Efforts that boost the lateral resolution, whether by increasing the STED effect or improving the detection method of the STED effect, will equally boost the axial resolution. STED NSIM offers a low-cost, fast 3D superresolution imaging capability for all biological samples from single molecules to densely labeled continuous structures, making it an accessible and reliable tool for various biological applications.

What is claimed is:

1. A superresolution STED-NSIM apparatus, comprising:
   a suitable light source adapted to provide an excitation beam along an excitation beam path and a STED beam along a STED beam path;
   a polarizing beam splitting component disposed in the STED beam path adapted to provide two STED beams having orthogonal polarizations along a first polarized STED beam path and a second polarized STED beam path;

a first optical component disposed in the first polarized STED beam path adapted to generate a first STED beam pair in the form of a first 1D STED pattern along a first STED beam pair path;

a second optical component disposed in the second polarized STED beam path adapted to generate a second STED beam pair in the form of a second 1D STED pattern along a second STED beam pair path, wherein the first STED beam pair and the second STED beam pair are mutually incoherent;

a beam combiner disposed in the first STED beam pair path and the second STED beam pair path, wherein four beams are output along a four STED beam path;

an objective lens disposed in an epifluorescence mode in both the excitation beam path and the four STED beam path and a fluorescence emission path and a sample-reflected STED beam path, wherein the four STED beams are combined to form a 2D structured STED pattern, and the 2D structured STED pattern and the fluorescence emission excitation beam are directed towards a sample object;

a position-controllable sample object mount;

a dichroic mirror disposed in a collinear sample-reflected STED beam path and a sample fluorescence emission path adapted to transmit/reflect the sample-reflected STED pattern/sample fluorescence emission;

an image-forming optical component adapted to generate a sample-reflected STED pattern image, disposed in the sample-reflected STED image path downstream of the dichroic mirror;

an image detector disposed to receive the reflected STED pattern image and the sample fluorescence emission; and a controller coupled to the image detector adapted to provide a position feedback control signal to the position-controllable sample object mount, wherein an image resolution is sub-diffraction-limited.

2. The STED-NSIM apparatus of claim 1, wherein the suitable light source is a low-coherence, broad-band, light source.

3. The STED-NSIM apparatus of claim 1, wherein the suitable light source is a supercontinuum laser.

4. The STED-NSIM apparatus of claim 1, wherein the excitation beam is 550 nm-571 nm±16 nm, the STED beam is 716 nm±20 nm, and the pulse duration is 150 ps-350 ps.

5. The STED-NSIM apparatus of claim 1, wherein the first optical component and the second optical component each comprises a diffraction grating and a lens.

6. The STED-NSIM apparatus of claim 1, wherein the objective lens is a 60× oil immersion objective having a full numerical aperture, $NA_{OBJ}$, greater than 1.0.

7. The STED-NSIM apparatus of claim 6, wherein the 2D structured STED pattern has a $NA_{STED}$ less than 1.0, such that the 2D STED pattern has a period from 380 nm-400 nm.

8. The STED-NSIM apparatus of claim 7, wherein $NA_{OBJ}$ is equal to 1.49 and $NA_{STED}$ is equal to 0.92.

9. The STED-NSIM apparatus of claim 1, wherein the image-forming optical component is mounted on a moveable translation stage along the optical path.

10. The STED-NSIM apparatus of claim 1, wherein the light source is pulsed.

11. The STED-NSIM apparatus of claim 1, comprising a STED-NSIM epifluorescence microscope.

12. The STED-NSIM apparatus of claim 1, wherein the image detector is an sCMOS camera.

13. The STED-NSIM apparatus of claim 1, wherein the sample object mount is an inverted sample stage, which allows a water immersed sample to be imaged through a non-metallized interface without SPR effects.

14. A superresolution STED-NSIM imaging method, comprising:

providing a fluorescence emission excitation beam and four STED beams having a given numerical aperture ($NA_{STED}$);

transmitting the fluorescence emission excitation beam and the four STED beams through an objective lens having a $NA_{OBJ}$ to generate a 2D structured STED pattern having a numerical aperture, NASTED, where $NA_{OBJ}$ is greater than $NA_{STED}$;

illuminating a sample target with the 2D STED pattern and with the fluorescence emission excitation beam in an epifluorescence mode;

propagating a fluorescence emission and a reflected 2D STED pattern from the sample through the objective lens;

propagating the reflected 2D STED pattern through an imaging component and forming a reflected 2D STED pattern image thereof on an image detector; and tracking a contrast of the reflected 2D STED pattern image during image acquisition to provide feedback to a sample holder translation stage to actively maintain focus of the sample, processing the 2D STED pattern image using a fully deterministic imaging processing method, in which a pre-calibrated set of parameters are used to process all image data, wherein the pre-calibrated set of parameters are determined by the following steps:

a) measure the 2D STED pattern period and orientation;

b) calibrating a phase shift step size between two separate 1D STED patterns to change the phase of a combined 2D STED pattern in the x- and y-directions, which are orthogonal to the axial z-direction; and c) measuring a STED quenching pattern phase to determine a real phase of the STED quenching pattern;

wherein, due to the STED depletion effect occurring in out-of-focus layers of the sample, out-of-focus emission under the epifluorescence mode does not reach the emission image detector thus providing superresolution along an axial axis of the sample.

15. The superresolution STED-NSIM imaging method of claim 14, further comprising tracking a contrast of the 2D STED pattern image during image acquisition to provide feedback signal to the sample piezo stage to maintain a focus position of the sample.

16. The superresolution STED-NSIM imaging method of claim 14, further comprising providing the $NA_{OBJ}$ from 1.4-1.5 for collecting an emission image and generating a 2D STED pattern at a $NA_{STED}$ between 0.90-0.95.

17. The superresolution STED-NSIM imaging method of claim 14, in which the pre-calibrated set of parameters are further determined by the following steps:

a) measuring a modulation strength ratio between harmonic orders of the STED pattern's nonlinear effect by analyzing images of the sample consisting of random scattered structures; and b) determining a bleaching rate map to correct individual raw image set intensities, $I_n(x, y, l)$ (where l is an exposure index), before NSIM reconstruction.

* * * * *